United States Patent Office 2,959,619
Patented Nov. 8, 1960

2,959,619

PROCESS FOR OXYGENATING POLYMERS OF BUTADIENE

William M. Hutchinson, Bartlesville, Okla., assignor to Phillips Petroleum Company, a corporation of Delaware No Drawing. Continuation of application Ser. No. 308,520, Sept. 8, 1952. This application Sept. 4, 1956, Ser. No. 607,556

4 Claims. (Cl. 260—594)

This invention relates to novel compositions of matter, i.e., oxygenated polymeric products. In a further aspect this invention relates to a process for oxidizing polymeric materials and subsequently deperoxidizing these materials to provide novel oxygenated products. In a further aspect this invention relates to a process for oxidizing polymeric materials and hydrogenating the oxidized material to provide oxidized-hydrogenated polymeric materials.

This is a continuation of my copending application Serial No. 308,520, filed September 8, 1952, now abandoned.

I have discovered that polymeric materials and more especially liquid polymeric materials, such as liquid polybutadiene, can be oxidized and then, if desired, hydrogenated. This oxidation is carried out at elevated temperatures in the presence of a catalyst by contacting these liquid polymers, dissolved or dispersed in a solvent, with a free oxygen containing gas. Following oxidation, the oxidized material can be deperoxidized. Either before or after this deperoxidation step the oxidized material can be hydrogenated.

Each of the following objects is attained by at least one of the aspects of this invention.

An object of this invention is to provide novel oxygenated polymeric products and to provide a process for preparing these products. A further object of this invention is to provide liquid oxidized-hydrogenated polymeric materials which are resistant to further oxidation. A further object of this invention is to provide novel products which can be employed as rubber softeners, components of coating compositions, tackifiers, and the like.

Further objects and advantages of this invention will be apparent to one skilled in the art upon reading this specification.

According to the process of the present invention a suitable liquid polymer or copolymer, such as liquid polybutadiene, having a viscosity in the range of 100 to 6000 Saybolt Furol seconds at 100° F. is dissolved or dispersed in an inert solvent, such as toluene, and charged to an oxidation reactor fitted with agitation means to provide complete contacting of the polymer solution or dispersion and oxidant during the oxidation reaction. The reactor is then closed and oxygen, or a suitable free oxygen containing gas such as air, is bubbled through the solution with heating and agitation for a period of 2 to 90 hours. In said oxidation an initiator such as an organic peroxide or hydroperoxide is frequently employed to start the reaction. When the oxidation has been terminated the product can be subjected to thermal treatment while in liquid phase at about oxidation reaction temperature to destroy peroxidic groups. The product so produced can be employed as a rubber softener, a component of a coating composition, tackifier, and the like.

In a further step in accordance with the process of my invention, the oxidation effluent described above, either before or after deperoxidation, is charged to a hydrogenation reactor for further treatment. If necessary, the oxidation effluent may be diluted with an additional quantity of solvent to lower its viscosity and thereby to provide improved contacting in the hydrogenation zone. Accordingly, the oxidation effluent is charged to the hydrogenator and a small amount of hydrogenation catalyst, such as palladium-on-charcoal or the like, is admixed therewith and the reactor is purged of air. Hydrogenation is then effected at a temperature in the range of 70° to 400° F. and with a pressure in the range of 30 to 4000 p.s.i.g. for a period of 2 minutes to 50 hours.

The products of the present invention contain from a fraction of 1% to 15% by weight of oxygen, more often 4 to 9% by weight of oxygen. The oxygen introduced into these materials is present in the form of carbonyl oxygen and as hydroxyl oxygen. The oxygenated products are further characterized by viscosities in the range from 300 to 10,000 Saybolt Furol seconds as measured at 100° F. and hydroxyl numbers in the range from 10 to 250 mg. of potassium hydroxide per gram of product.

In the oxygenated hydrogenated materials, carbonyl oxygen is partially converted to hydroxyl oxygen and at least a portion of the remaining unsaturation in the molecule is saturated with hydrogen. The hydrogenated products are characterized by a lack of "skinning" when exposed to the atmosphere. Oxygenated-hydrogenated polymeric products are produced which contain from a fraction of 1% to 15% by weight of oxygen, said oxygen being present in the form of carbonylic oxygen and hydroxyl oxygen. These products are especially useful as softeners for elastomers.

Polymeric materials applicable for use as starting materials in the preparation of my novel products include liquid polymers of conjugated dienes and liquid copolymers of conjugated dienes with compounds containing an active $CH_2=C<$ group. The liquid polymers applicable for use in this invention can be prepared by any polymerization method, such as mass or emulsion polymerization, conducted in such manner that liquid polymers are formed. One such method comprises polymerizing diolefins or cyclodiolefins such as 1,3-butadiene, isoprene, 1,3-cyclopentadiene, 1,3-cyclohexadiene and the like in the presence of a catalyst, for example, anhydrous hydrogen fluoride dissolved in a aliphatic polyfluoro compound such as 1,1-difluoroethane. Particularly adaptable are liquid polymers of butadiene prepared according to the method of Patent 2,631,175 of W. W. Crouch, filed December 23, 1948, wherein 1,3-butadiene is polymerized in the presence of an alkali metal catalyst such as finely divided sodium, and a suitable diluent such as xylene. Suitable comonomers for the monomeric materials disclosed above include styrene, alkyl, substituted styrenes, acrylonitrile, ethyl acrylate, methyl acrylate, methyl methacrylate and others known in the art. The liquid polymeric starting materials used in the present invention are characterized by having viscosities in the range from 100 to 6,000 Saybolt Furol seconds at 100° F. Reaction conditions in the oxidation zone include temperatures in the range from 125° to 375° F., preferably 150° to 290° F., and atmospheric pressures are usually satisfactory although higher pressures are employed to maintain liquid phase conditions to prevent loss of solvent, where a low-boiling solvent is used. The length of the oxidation period varies depending upon the degree of oxidation desired, but is usually in the range from 2 to 90 hours, preferably 4 to 25 hours. I prefer to conduct the oxidation in such manner as to provide an oxidate having an oxygen content in the range from approximately 4 to 9 weight percent of oxygen. Oxidation initiators known in the art can be employed, if desired, to start the oxidation reaction. Materials which are free radical generators under the conditions employed are used for this purpose. These include organic peroxides and hydroperoxides such as benzoyl peroxide, acetyl peroxide, diisopropylbenzene hydroperoxide [dimethyl(isopropylphenyl)hydroperoxymethane], tert-butylisopropylbenzene hydroperoxide [dimethyl(tert-butylphenyl)hydroperoxymethane], isopropylbenzene hydroperoxide [dimethyl(phenyl)hydroperoxymethane], and the like. The amount of initiator employed will be in the range of 0.1 to 10 weight percent of the polymeric material being oxidized.

Hydrogenation conditions include temperatures in the range of from 70° to 400° F., preferably from 90° to 300° F. Any suitable pressure within the capacity of the hydrogenator can be employed with pressures from about 30 to 4000 p.s.i.g. providing a convenient operating range. The length of the hydrogenation will be in the range from 2 minutes to 50 hours, preferably from 10 minutes to 2 hours. Suitable catalysts include palladium, nickel, rhodium, cobalt, platinum and the like either supported or unsupported. Catalysts such as copper chromite, molybdenum sulfide or others of similar nature, while less preferred, can also be employed.

Solvents for the starting materials include those materials which are substantially inert to oxidation or hydrogenation under the conditions employed. In the oxidation step it is desirable to employ a solvent to prevent gelation of the reaction mixture. Solvents suitable for use both in the oxidation and hydrogenation steps include straight chain hydrocarbons containing from 6 to 10 carbon atoms, aromatic hydrocarbons such as benzene, toluene, xylene and the like, dioxane, isopropyl alcohol, carbon tetrachloride and others.

The novel materials produced in the persent invention are useful as additives for elastomers such as rubber, resinous materials such as polyvinyl chloride and the like. They are also useful as adhesives, paint or varnish components, etc.

*Example I*

A charge comprising 50 grams of sodium-polymerized liquid polybutadiene having a viscosity of 488 Saybolt Furol seconds at 100° F., 0.5 gram of hyperoxide initiator [1] and 500 grams of carbon tetrachloride was placed in a reactor provided with stirring means and a tube for the introduction of oxygen just above the stirrer. Upon completion of charging, the reactant mixture was heated to a temperature of 155°–160° F. and oxidation was started. Excess oxygen was bubbled through the rapidly stirred mixture at the aforementioned temperature for a period of 24 hours. At the end of this period oxygen was cut off and the reaction mixture thereafter held at 155° to 160° F. for approximately 6 hours to decompose peroxidic materials. At this point a sample of the oxidation product was soluble in normal heptane and insoluble in acetone. The product was stripped of solvent and dried in air for 15 hours at 212° F. Before drying the stripped product was fluid at 140° F. and stiff at room temperature (70° F.). After drying the material had set to a soft gel. The product was soluble in acetone and had a carbon content of 79.5 weight percent, hydrogen content of 10.2 weight percent and oxygen [2] by difference of 9.1 weight percent. The product had a hydroxyl number of 161 mg. KOH/g. sample.

*Example II*

A charge comprising 410 grams of sodium polymerized liquid polybutadiene having a viscosity of 435 Saybolt Furol seconds at 100° F., 2000 grams of toluene, and 5 grams of cumene hydroperoxide was placed in a reactor provided with a stirrer and a tube for the introduction of oxygen just above the stirrer. Upon completion of charging, the temperature was raised to 203° F. and oxidation was started. Excess oxygen was bubbled through the rapidly stirred reaction mixture at a temperature in the range from 199° to 205° F. for a period of 8.25 hours. At the end of this period oxygen was cut off and the reaction mixture was held at 230° F. for approximately 16 hours to decompose peroxidic materials.

Solvent was then removed by fractionation to recover the product. The product has a carbon content of 83.26 weight percent, a hydrogen content of 10.24 weight percent and an oxygen content (by difference) of 6.48 weight percent.

This product was evaluated as a plasticizer in a tire tread recipe using a 41° F., 60 Mooney (ML–4), 71/29 butadiene-styrene elastomer. Stocks were compounded using the following recipe:

| | Parts by weight |
|---|---|
| 41° F. GR–S (butadiene-styrene rubber) | 100.0 |
| Philblack O #5 [1] | 50.0 |
| Zinc oxide | 3.0 |
| Stearic acid | 1.0 |
| Flexamine [2] | 1.0 |
| Sulfur | 1.75 |
| Santocure [3] | 1.0 |
| Softener | 10.0 |

[1] High abrasion furnace black.
[2] A physical mixture containing 65 percent of a complex diarylamine-ketone reaction product and 35 percent of N,N'-diphenyl-p-phenylenediamine.
[3] A rubber accelerator. A condensation product of mercaptobenzothiazole with cyclohexylamine. A light tan or buff-colored powder; M.P. 90° C. (min.); sp. gr. 1.27.

The compounded stocks were milled and cured for 30 minutes at 307° F. and physical properties of each vulcanizate determined. A control was run using a blend of equal parts of Paraflux (an asphaltic flux) and Circosol–2XH (a petroleum hydrocarbon softener containing hydrocarbons of high molecular weight in the form of a heavy, viscous, transparent, pale green, odorless liquid of low volatility; sp. gr. 0.904; Saybolt viscosity at

---

[1] Soltrol 140 hyderoperoxide (41 wt. percent hydroperoxide in the parent hydrocarbon). Soltrol 140 is an isoparaffinic hydrocarbon fraction boiling in the range from 365° to 410° F., prepared by catalytic alkylation of paraffins with monoolefins.

[2] Analysis showed 1.2 weight percent chlorine (from solvent).

100° F., about 2000 seconds). The following evaluation data were obtained:

|  | Oxygenated Liquid Polybutadiene | Circosol-Paraflux Blend |
|---|---|---|
| Unaged Samples: | | |
| Stress-strain properties at 80° F.— | | |
| 300 Percent Modulus, p.s.i. | 670 | 1,180 |
| Tensile, p.s.i. | 3,200 | 3,520 |
| Elongation, Percent | 700 | 600 |
| Stress-strain properties at 200° F., 45 min. cure— | | |
| Tensile, p.s.i. | 2,030 | 2,300 |
| Hysteresis, ΔT, ° F. | 107.8 | 66.9 |
| Resilience, Percent | 57.7 | 64.0 |
| Flex Life, M | 57.3 | 28.1 |
| Shore Hardness | 55 | 52 |
| Compression set, Percent | 23.0 | 21.8 |
| Compounded MS 1½ | 43.5 | 40 |
| Extrusion at 250° F.: | | |
| Inches/Minute | 35.2 | 38 |
| Grams/Minute | 105 | 105 |
| Hand Tack | 8 | 6 |
| T-R Freeze Point, ° C. | −50.5 | −51.5 |
| Oven Aged 24 Hours at 212° F.: | | |
| Stress-strain properties at 80° F.— | | |
| 300 Percent Modulus, p.s.i. | 1,670 | 2,260 |
| Tensile, p.s.i. | 3,450 | 3,650 |
| Elongation, Percent | 530 | 435 |
| Hysteresis, ΔT, ° F. | 69.9 | 55.1 |
| Resilience, Percent | 63.1 | 69.3 |
| Flex Life, M | 29.0 | 9.9 |
| Shore Hardness | 65 | 62 |

*Example III*

A charge comprising 600 grams of sodium-polymerized liquid polybutadiene having a viscosity of 435 Saybolt Furol seconds at 100° F., 9 grams of cumene hydroperoxide, and 1200 grams of toluene, was placed in a reactor provided with stirring means and a tube for the introduction of oxygen just above the stirrer. Upon completion of charging, the temperature of the reactants was raised to 203° F. and oxidation begun. Excess oxygen was bubbled through the rapidly stirred mixture at a temperature in the range of 200° to 205° F. for a period of 88¼ hours. At the end of this period oxygen feed was stopped and the reaction mixture was thereafter held at 203° F. for approximately 16 hours to decompose peroxidic oxidation products. The reaction mixture was then treated with decoloring charcoal and Celite [3] filter-aid and filtered. To 250 ml. of the above filtrate was added 250 ml. of a 50–50 mixture of dioxane and isopropyl alcohol. One gram of 10 percent palladium-on-charcoal catalyst (a commercial preparation comprised of about 10 weight percent palladium on activated charcoal) was then added and the mixture charged to a hydrogenator. After 28 hours at a temperature of 85° to 94° F. and a hydrogen pressure of 1200 to 1040 pounds per square inch gage, approximately 0.44 mole of hydrogen had been adsorbed. Approximately 95 percent of the hydrogen absorption was effected during the first 37 minutes of operation. At this point the catalyst was removed by filtration and the filtrate stripped of solvent at from 100 to 200° F. and from 100 to 2 mm. mercury pressure.

The product obtained from the above operation was medium brown in color and was tacky. It did not "skin" when exposed to the atmosphere for 6 days at 158° F. The product had a hydroxyl number of 90 mg. KOH/g. sample when analyzed by the acetic anhydride-pyridine method.

The above product was evaluated as a softener for a 74/26 1,3-butadiene-acrylonitrile copolymer prepared by emulsion polymerization. The following compounding recipe was employed.

| | Parts by weight |
|---|---|
| 1,3-butadiene-acrylonitrile copolymer | 100 |
| Philblack A [1] | 60.0 |
| Zinc oxide | 5.0 |
| Altax [2] | 1.5 |
| Stearic acid | 1.5 |
| Sulfur | 1.5 |
| Softener | 10.0 |

[1] Medium abrasion furnace black.
[2] Benzothiazyl disulfide.

The samples were compounded and cured at 307° F. for 30 minutes. The results obtained are recorded in the following table.

| Softener | 80° F. | | | | Percent Compression Set | Percent [c] Swelled | Percent [c] Extracted |
|---|---|---|---|---|---|---|---|
| | Phr.[b] Softener | 300% Modulus, p.s.i. | Tensile, p.s.i. | Percent Elongation [a] | | | |
| Oxygenated Polybutadiene | 10 | 1,360 | 2,440 | 465 | 13.5 | 52.5 | 2.8 |
| TP-90B [d] | 10 | 1,590 | 2,840 | 440 | 15.0 | 38.6 | 4.8 |
| Dibutyl phthalate | 10 | 1,380 | 2,560 | 460 | 15.0 | 38.6 | 4.7 |

OVEN AGED 24 HOURS AT 212° F.

| | | | | | | | |
|---|---|---|---|---|---|---|---|
| Oxygenated Polybutadiene | 10 | 2,220 | 2,420 | 330 | | | |
| TP-90B | 10 | 2,670 | 3,060 | 330 | | | |
| Dibutyl phthalate | 10 | 2,440 | 3,180 | 380 | | | |

[a] 45 minute cures used on aged stress-strain tests.
[b] Phr.—parts per 100 parts of rubber.
[c] Seven days in 70/30 isooctane-toluene mixture, 45 minutes cure.
[d] TP-90B, a well known polyether of high molecular weight generally employed in low temperature plasticization, as a control or reference for evaluation of new plasticizer materials.

The test data show that oxygenated-hydrogenated liquid polybutadiene of the present invention provides compounded rubber stocks of good tensile strength. The test data further show that oxygenated-hydrogenated liquid polybutadiene is more resistant to extraction than TP-90B.

The product was also evaluated as a plasticizer in a tread recipe using a 41° F., 60 Mooney (ML-4), 71/29 butadiene-styrene elastomer. Stocks were compounded using the following recipe:

| | Parts by weight |
|---|---|
| 41° F. GR–S (butadiene-styrene rubber) | 100.0 |
| Philblack O # 5 [1] | 50.0 |
| Zinc oxide | 3.0 |
| Stearic acid | 1.0 |
| Flexamine [2] | 1.0 |
| Sulfur | 1.75 |
| Santocure [3] | 1.0 |
| Softener | 10.0 |

[1] High abrasion furnace black.
[2] A physical mixture containing 65 percent of a complex diarylamine-ketone reaction product and 35 percent of N,N'-diphenyl-p-phenylene-diamine.
[3] A rubber accelerator. A condensation product of mercaptobenzothiazole with cyclohexylamine. A light tan or buff-colored powder; M.P. 90°–194° F. (min.); sp. gr. 1.27.

The compounded stocks were milled and cured for 30 minutes at 307° F. and physical properties of each vul-

[3] A filter aid made from exceptionally pure, inert, diatomaceous silica (celite) of fine pore size; especially adapted for removing slimy or colloidal material from filtrations of semi-viscous or non-viscous liquids. Comparable in use but more uniform in particle size than infusorial earth (kieselguhr).

canizate determined. A control was run using a blend of equal parts of Paraflux (an asphaltic flux) with Circosol-2XH (a petroleum hydrocarbon softener containing hydrocarbons of high molecular weight in the form of heavy, viscous, transparent, pale green, odorless liquid of low volatility; sp. gr. 0.940; Saybolt viscosity at 100° F., about 2000 seconds). The following evaluation data were obtained.

|  | Oxygenated Liquid Polybutadiene | Circosol-Paraflux Blend |
|---|---|---|
| Unaged Samples: |  |  |
| Stress-strain properties at 80° F.— |  |  |
| 300 Percent Modulus, p.s.i. | 1,070 | 1,170 |
| Tensile, p.s.i. | 3,430 | 3,560 |
| Elongation, Percent | 645 | 610 |
| Stress-strain properties at 200° F., 45 min. cure— |  |  |
| Tensile, p.s.i. | 2,040 | 2,020 |
| Hysteresis, ΔT, °F. | 83.8 | 66.9 |
| Resilience, Percent | 53.8 | 61.5 |
| Flex Life, M | 30.2 | 31.5 |
| Shore Hardness | 58 | 54 |
| Compression Set, Percent | 18.6 | 17.9 |
| Compounded MS 1½ | 40.5 | 37.5 |
| Extrusion at 250° F.: |  |  |
| Inches/minute | 40.3 | 40.1 |
| Grams/minute | 102 | 100 |
| Meter Tack, separation load, grams: |  |  |
| 1 day | 250 | <25 |
| 7 days | 245 | 35 |
| Oven Aged 24 Hours at 212° F.: |  |  |
| Stress-strain properties at 80° F.— |  |  |
| 300 Percent Modulus, p.s.i. | 1,900 | 2,170 |
| Tensile, p.s.i. | 3,400 | 3,530 |
| Elongation, Percent | 460 | 425 |
| Hysteresis, ΔT, °F. | 64.5 | 53.0 |
| Resilience, Percent | 60.6 | 67.7 |
| Flex Life, M | 14.7 | 10.7 |
| Shore Hardness | 65 | 60 |

These data show that the softener of the present invention provides tread stocks of improved tack and aged flex life.

As many possible embodiments may be made of this invention without departing from the scope thereof, it is to be understood that all matter herein set forth is to be interpreted as illustrative and not in a limiting sense.

I claim:

1. A process of preparing polymers of butadiene containing up to 15 percent oxygen by weight, said oxygen being present in the form of carbonylic oxygen and hydroxyl oxygen, comprising mixing a liquid polymer of butadiene with a solvent, contacting said mixture with a free oxygen containing gas at a temperature in the range of 125° to 375° F., stopping the flow of said oxygen containing gas, maintaining said elevated temperature for a period of time to decompose peroxidic groups, and recovering an oxidized polymer of butadiene.

2. A process of preparing polymers of butadiene containing up to 15 percent oxygen by weight, said oxygen being present in the form of carbonylic oxygen and hydroxyl oxygen, comprising mixing a liquid polymer of butadiene with a solvent, contacting said mixture with a free oxygen containing gas in the presence of an oxidation initiator selected from the group consisting of organic peroxides and organic hydroperoxides at a temperature in the range of 125° to 375° F., stopping the flow of said oxygen containing gas, maintaining said elevated temperature for a period of time to decompose peroxidic groups, and recovering an oxidized polymer of butadiene.

3. A process for preparing an oxygenated polymer of butadiene containing up to 15 percent oxygen by weight, said oxygen being present in the form of carbonylic oxygen and hydroxyl oxygen, and having a viscosity of 300 to 10,000 Saybolt Furol seconds at 100° F. and a hydroxyl number of 10 to 250 mg. of potassium hydroxide per gram of product, comprising mixing a polymer of butadiene having a viscosity of 100 to 6000 Saybolt Furol seconds at 100° F. with an inert solvent, agitating said mixture and contacting same with a free oxygen containing gas for a period of 2 to 50 hours in the presence of an oxidation initiator selected from the group consisting of organic peroxides and hydroperoxides at a temperature of 125° to 375° F. and under a pressure sufficient to maintain liquid phase conditions, stopping addition of said free oxygen containing gas, maintaining said elevated temperature for a period of time to destroy peroxidic groups, and recovering the thus treated polymer.

4. A process for preparing an oxygenated polymer of butadiene containing from four to nine percent oxygen by weight, said oxygen being present in the form of carbonylic oxygen and hydroxyl oxygen, and having a viscosity of 300 to 10,000 Saybolt Furol seconds at 100° F. and a hydroxyl number of 10 to 250 mg. of potassium hydroxide per gram of product, comprising mixing a polymer of butadiene having a viscosity of 100 to 6,000 Saybolt Furol seconds at 100° F. with an inert solvent, agitating said mixture and contacting same with a free oxygen containing gas for a period of 4 to 25 hours in the presence of an oxidation initiator selected from the group consisting of organic peroxides and hydroperoxides at a temperature of 150° to 290° F. and under a pressure sufficient to maintain liquid phase conditions, stopping addition of said free oxygen containing gas, maintaining said elevated temperature for a period of time to destroy peroxidic groups, and recovering the thus treated polymer.

References Cited in the file of this patent

UNITED STATES PATENTS

| 1,901,045 | Schmidt | Mar. 14, 1933 |
| 2,315,037 | Bannon | Mar. 30, 1943 |
| 2,474,670 | Hersberger et al. | June 28, 1949 |
| 2,560,031 | Cline | July 10, 1951 |
| 2,611,758 | Sarbach | Sept. 23, 1952 |
| 2,692,892 | Hillyer et al. | Oct. 26, 1954 |
| 2,731,454 | Edmonds | Jan. 17, 1956 |